(12) United States Patent
Margalit

(10) Patent No.: US 6,839,482 B2
(45) Date of Patent: Jan. 4, 2005

(54) TUNABLE OPTICAL FILTERING DEVICE AND METHOD

(75) Inventor: Moti Margalit, Zichron Yaaqov (IL)

(73) Assignee: Lambda Crossing Ltd., Caesaria (IL)

( * ) Notice: Subject to any disclaimer, the term of this patent is extended or adjusted under 35 U.S.C. 154(b) by 365 days.

(21) Appl. No.: 10/173,540

(22) Filed: Jun. 17, 2002

(65) Prior Publication Data

US 2004/0013355 A1 Jan. 22, 2004

(51) Int. Cl.⁷ .............................................. G02B 6/42
(52) U.S. Cl. ........................................ 385/27; 385/14
(58) Field of Search .............................. 385/27, 11, 14, 385/37, 18, 24, 140, 15; 359/578, 579, 885, 889, 573, 359

(56) References Cited

U.S. PATENT DOCUMENTS

| | | | |
|---|---|---|---|
| 4,505,550 A * | 3/1985 | Steinbruegge | 359/308 |
| 5,542,010 A * | 7/1996 | Glance et al. | 385/14 |
| 5,629,995 A | 5/1997 | Duck et al. | 385/24 |
| 5,771,112 A | 6/1998 | Hamel et al. | 359/128 |
| 6,091,870 A | 7/2000 | Eldada | 385/37 |
| 6,195,187 B1 | 2/2001 | Soref et al. | |
| 6,459,844 B1 * | 10/2002 | Pan | 385/140 |
| 6,498,682 B2 * | 12/2002 | Glance | 359/578 |
| 6,504,616 B1 * | 1/2003 | Haber et al. | 356/519 |
| 6,721,466 B2 * | 4/2004 | Taylor et al. | 385/11 |
| 2001/0002940 A1 * | 6/2001 | Glance | 385/18 |
| 2003/0215183 A1 * | 11/2003 | Wildnauer et al. | 385/37 |
| 2004/0013355 A1 * | 1/2004 | Margalit | 385/27 |

FOREIGN PATENT DOCUMENTS

| | | |
|---|---|---|
| EP | 0 141 771 | 5/1985 |
| EP | 1 176 438 | 1/2002 |
| WO | 01 22141 | 3/2001 |
| WO | 01 27692 | 4/2001 |
| WO | 0127692 | 4/2001 |

OTHER PUBLICATIONS

Ahn, S–W, et al. "Grating–Assisted Codirectional Coupler Filter Using Electrooptic and Passive Polymer Waveguides" *IEEE J. on Selected Topics in Quantum Electronics*, vol. 7, No. 5, p. 819–825 (2001).

Coldren, L.A. "Monolithic Tunable Diode Lasers" *IEEE J. on Selected Topics in Quantum Electronics*, vol. 6, No. 6, p. 988–999, (2000).

(List continued on next page.)

*Primary Examiner*—Thien M. Le
(74) *Attorney, Agent, or Firm*—Ladas & Parry

(57) ABSTRACT

A tunable filter structure, and an optical method and device utilizing the same are presented for processing a multi-frequency light signal to separate therefrom a desired frequency range. The filter structure has an input for receiving the multi-frequency input light signal, a first output for outputting a first light component of the input light signal including light of said predetermined frequency range, a second output for outputting a second light component including a remaining portion of the input light signal, and an intermediate input. The first output and the intermediate input of the filter structure may be connected to, respectively, input and output of a tunable frequency-selective optical unit, which may be a second filter structure, amplifier, attenuator. By using the second filter structure with a different tuning range as compared to that of the first filter structure such that these tuning ranges define overlapping spectra of the filter structures, a two-stage filter device is provided.

18 Claims, 4 Drawing Sheets

OTHER PUBLICATIONS

Koshiba, M. "Wavelength Division Multiplexing and Demultiplexing With Photonic Crystal Waveguide Couplers" *Journal of Lightwave Technology*, vol. 19, No. 12, p. 1970–1975, (2001).

Rigole, P–J., et al. "114–nm Wavelength Tuning Range of a Vertical Grating Assisted Codirectional Coupler . . . Reflector" *IEEE Photonics Technology Letters*, vol. 7, No. 7, p. 697–699, (1995).

English Abstract of EP 0 141 771 dated May 15, 1985.

Soref, R.A. et al. "Proposed N–Wavelength M–Fiber WDM Crossconnect Switch Using Active Microring Resonators" IEEE Photonics Technology Letters, vol. 10, No. 8 (1998) pp 1121–1123.

* cited by examiner

TUNABLE OPTICAL FILTERING DEVICE AND METHOD

FIELD OF THE INVENTION

This invention is generally in the field of optical devices for use in optical communication systems, and relates to a wavelength selective tunable filtering device and method, particularly useful for adding or dropping channels in a wavelength division multiplexing (WDM) system.

BACKGROUND OF THE INVENTION

Optical transmission systems, which are based on wavelength division multiplexing (WDM), achieve high information capacities by aggregating many optical channels, each with a unique carrier frequency, onto a signal strand of optical fiber. Tunable filters play a critical role in WDM communication systems. A tunable filter, which can redirect and route light signals of certain wavelengths (channels), is used:

in conjunction with a tunable laser to create a tunable transmitter, midway in the fiber in wavelength for add and drop multiplexing applications, at the receiving end in conjunction with a broad band detector for a tunable receiver.

In applications utilizing add and drop multiplexing, the tunable filter is often termed a three or more port device, with input, express and add (drop) ports. In these applications, the network traffic enters an optical device at the input, with most of the channels leaving at the express port. The dropped channels are redirected to the drop port, while the added channels are input from the add port. The filter is characterized by the following key parameters: bandwidth, attenuation (rejection) of out of band signal, tuning range, required power, hitless tuning, and free spectral range.

Known techniques of the kind specified provide for the following two categories of implementing three- or four-port tunable filters:

Providing spatial distribution of the different channels, and switching of the channel(s) to be dropped. Here, tunability is achieved by applying spatially distinct switches, which switch different channels to the drop port [U.S. Pat. No. 5,771,112].

Changing the frequency of operation by physical changes in the optical filter medium. This is the so-called scanning unable filter, since it scans over frequencies [U.S. Pat. No. 6,091,870].

For most applications, the scanning filter presents a cost-effective solution and is the preferred method of realization of the tunable filter for add/drop multiplexing. However, most of the known implementations of scanning filters fall short of fulfilling the required specifications, because of inherent material physical limitations.

SUMMARY OF THE INVENTION

There is a need in the art to facilitate scanning tunable filtering of a multi-frequency light signal (multiple optical channels) propagating through a communication system to separate therefrom a specific frequency component (optical channel) for adding or dropping purposes, by providing a novel tunable optical filter device and method.

The technique of the present invention utilizes a tunable filter structure, which, in addition to one input and two outputs typically provided in a filter, has at least one intermediate input. One of the outputs of the filter structure and the intermediate input serve for connecting to, respectively, the input and output of a frequency selective optical unit.

There is thus provided according to one broad aspect of the present invention, a tunable filter structure for use in processing an input multi-frequency light signal to separate therefrom light of a predetermined frequency range, the filter structure comprising an input for receiving the multi-frequency input light signal, a first output for outputting a first light component of the input light signal including light of said predetermined frequency range, a second output for outputting a second light component including a remaining portion of the input light signal, and an intermediate input.

According to another aspect of the invention, there is provided an optical device comprising:

a tunable filter structure operable to process and input multi-frequency light signal to separate therefrom light of a predetermined frequency range, the filter structure comprising an input for receiving the multi-frequency input light signal, a first output for outputting a first light component of the input light signal including light of said predetermined frequency range, a second output for outputting a second light component including a remaining portion of the input light signal, and an intermediate input; and a tunable frequency-selective optical unit having an input for receiving said first light component and an output for directing to said intermediate input of the filter structure a portion of said first light component outside a tuning range of the optical unit.

The filter structure may be implemented as a two-part filter having first and second successive filter units tuned to the same frequency band. The first filter unit has an input presenting the input of the filter structure and two outputs, one connected to an input of the second filter unit and the other connected to a further optical unit, and the second filter unit has one output presenting the output of the filter structure and two inputs, one connected to the output of the first filter unit and the other presenting said intermediate input of the filter structure.

The tunable frequency-selective optical unit may be an amplifier, attenuator, or a second filter structure with the tuning range different from that of the first filter structure. When using the second filter structure, a two-stage (or two-layer) filter device is obtained. In this case, the tuning range of the second filter structure can be simpler (i.e., either defining a smaller spectral range or wider channel spacing) than that of the first filter structure.

Thus, the present invention further provides a novel method and device based on complimentary two-stage (or two-layer) filtering, wherein the required parameter set from each filter layer is defined independently. The function of the first stage filtering is to spatially separate between spectrally distinct groups of optical channels in the input light. The channels may be grouped by a fixed frequency spacing (free spectral range) or within a fixed width optical bandwidth. The second stage filtering operates only on the spatially distinct subset of channels filtered out by the first stage filtering. Hence, the parameters of the second stage filter are relaxed and its tuning range minimized to address only the group of channels it contends with, since light appearing at the second filter has a wider frequency spacing than the original input signal.

An input multi-channel light signal undergoes the first filtering stage in the first filtering structure with a first tuning range, resulting in first and second output light components, the first light component of a certain frequency range of the input light including a predetermined frequency (e.g., which is to be dropped), and the second light component containing a remaining portion of the input light. The first light component then undergoes the second filtering stage in the second filtering structure with a second tuning range that can be minimized to address only the group of channels contained in the first light component. The first and second tuning ranges are such as to provide overlapping between the optical spectra of the first and second filter structures. The second filtering results in that the predetermined frequency component is separated and directed to a drop (or add) channel, while a remaining portion of the first light component again undergoes the first-stage filtering to be directed to an optical path of the second light component.

According to yet another broad aspect of the present invention, there is provided an optical filter device for processing a multi-frequency light signal to separate therefrom a predetermined frequency component, the device comprising first and second tunable filter structures with overlapping optical spectra, the first filter structure being operable to receive the input light signal, separate therefrom light of a specific frequency range including said predetermined frequency component, and direct said light to the second filter structure while directing a remaining portion of the input light to a second output of the device, the second filter structure being operable to receive the light of the specific frequency range and separating therefrom the predetermined frequency component to a first output of the device while directing a remaining portion of said light into the first filter structure to be output at the second output of the device.

According to yet another aspect of the present invention, there is provided an optical filter device, wherein:
  the device comprises an input light port, first and second output ports, and first and second tunable filter structures having tuning ranges defining overlapping spectra of the filter structures, the device being operable to transfer a predetermined frequency component of a multi-frequency input light signal to the first output port and transfer a remaining portion of the input light signal to the second output port;
  a first tunable filter structure has an input connected to said input light port, an output connected to said second output port, an intermediate input, and an intermediate output;
  the second tunable filter structure has an input connected to the intermediate output of the first filter structure, a through port connected to the intermediate input of the first filter structure, and an output connected to the first output port of the device.

Generally, the first filter may have more than one pair of intermediate input-output, and the device may comprise more than one drop or add port (first output port). In this case, a corresponding number of second-stage filter structures may be used in the device (each associated with a corresponding pair of the intermediate input-output of the first filter structure) to independently filter out of the input light several predetermined frequency components.

According to yet another aspect of the invention, there is provided an optical filter device for processing a multi-frequency light signal to separate therefrom a predetermined frequency component, the device comprising:
  (i) a first tunable filter structure having a first tuning range and operable to receive an input light signal and output first and second light components thereof through first and second spatially separated light paths, respectively, the first light component having a specific frequency range of the input signal including said predetermined frequency component, and the second light component including a remaining portion of the input light;
  (ii) a second tunable filter structure having a second tuning range defining an optical spectrum overlapping with that of the first filter, the second filter being operable to receive the first light component and separate therefrom said predetermined frequency component to propagate to a drop/add light path of the device and direct a remaining portion of the first light component into the first filter structure to be output at the second light path.

Each of the first and second filters can be realized using one of the following:
  a grating assisted coupler (GAC) ["Grating-Assisted Codirectional Coupler Filter Using Electrooptic and Passive Polymer Waveguides", Sch-Won, Ahn and Sang-Yung Shin, IEEE Journal on Selected Topics in Quantum Electronics, Vol. 7, No. 5, September/October 2001, pp. 819–825] that transfers light of a specific frequency band from one output of the coupler to the other;
  one or more closed loop resonator(s) [WO 01/27692, assigned to the assignee of the present application];
  a reflective grating such as sampled gratings ["Monolithic Tunable Diode Lasers", L. A. Coldren, IEEE Journal On Selected Topics In Quantum Electronics, Vol. 6, No. 6, November/December 2000, p.988]; and
  a photonic crystal ["Wavelength Division Multiplexing and Demultiplexing With Photonic Crystal Waveguide Couplers", Masanori Koshiba, Journal of Lightwave Technology, Vol. 19, No. 12, December 2001, p.1027].

Generally, the first stage filtering may be implemented using any other suitable coupler device, for example, of the kind whose physical parameters, such as the length, the strength of coupling between the two optical paths, and the phase difference across the coupling length define the amount of transferred energy. Additional embodiments may include alternative light paths, such as free space optics, and other types of filters [U.S. Pat. No. 5,629,995]. When both the first and the second filtering stages are realized by ring resonators, the optical device may be implemented as a planar lightwave circuit (PLC) that has an inherent advantage in the integration of complex optical functions. Lightpaths are preferably realized using waveguides in which the refractive index of a core region, where light is guided, is higher than the refractive index of a cladding region. Light is typically introduced into the tunable device by coupling an optical fiber to the input waveguide of the device.

The present invention also provides a method for processing a multi-frequency light signal to separate therefrom a predetermined frequency component, the method comprising:
  applying to the multi-frequency input light signal a first filtering with a first tuning range, thereby providing first and second light components of the input signal propagating along first and second spatially separated optical paths, respectively, the first light component having a specific frequency range of the input signal including said predetermined frequency component, and the second light component including a remaining portion of the input signal;
  applying to the first light component a second filtering with a second tuning range in an optical spectrum overlapping with that of the filtering, thereby separating said predetermined frequency component from the first light component and directing it to an output channel while directing a remaining portion of the first light component to undergo said first filtering to be output at said second light path.

BRIEF DESCRIPTION OF THE DRAWINGS

In order to understand the invention and to see how it may be carried out in practice, preferred embodiments will now be described, by way of non-limiting examples only, with reference to the accompanying drawings, in which.

DETAILED DESCRIPTION OF THE INVENTION

Figure 1:
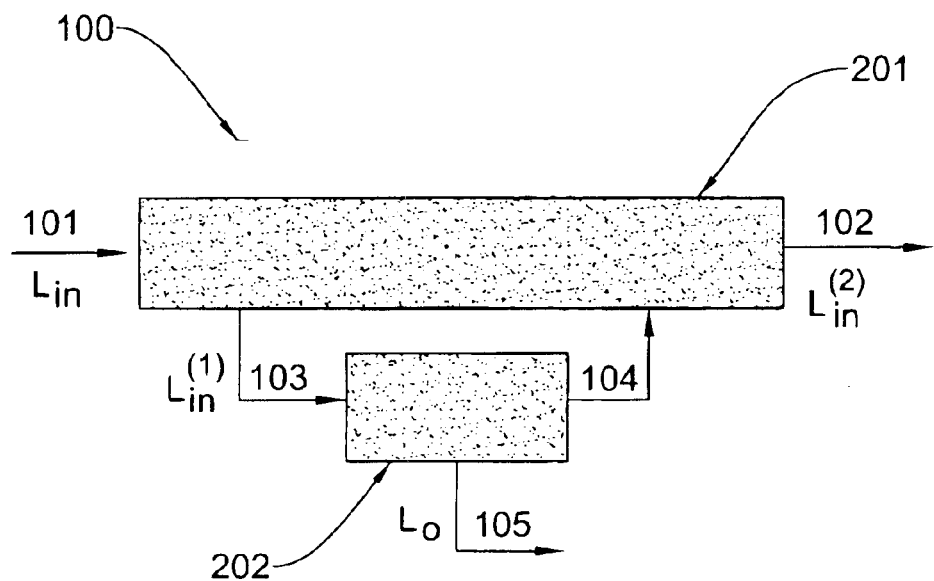
FIG. 1 is a schematic illustration of a two-stage tunable filter device according to the invention.

Referring to FIG. 1, there is illustrated a tunable filter structure 201 according to the invention connectable to a tunable frequency selective optical unit 202. The optical unit may be a filter structure, amplifier, attenuator, etc. The filter structure 201 has one input associated with an input light-path 101, a first output associated with a light-path 103, a second output associated with a light-path 102, and an intermediate input associated with a light-path 104. The second output and intermediate input of the structure 201 serves for connecting to, respectively, the input and output of the optical unit 202.

In the present example, the optical unit 202 is a filter structure. A combination of the filter structures 201 and 202 connected to each other as described above thus presents a tunable optical filter device 100 according to the invention, wherein the tunable filter structures 201 and 202 serve as first-stage (first-layer) and second-stage (second-layer) tunable filters, respectively, of the device 100. The filters 201 and 202 have tuning ranges defining overlapping spectra. The input of the structure 201 presents an input port of the device, the output associated with the light-path 102 presents a second output port of the device, the output associated with the light-path 103 presents an intermediate output of the device, and the intermediate input associated with the light-path 104 presents an intermediate input of the device 100. The second layer tunable filter 202 has input and output associated with the light-paths 103 and 104, respectively, and an output constituting the first output port of the device 100 associated with a drop (add) path 105.

In the present example of FIG. 1, the device 100 has a single drop (add) channel 105. It should, however, be understood that more than one drop/add channel can be provided to separately filter out of the input light several frequency components, respectively. In this case, the first-stage filter structure 201 will be formed with more than one pair of intermediate input-output (light paths 103 and 104), each pair being associated with a different second-stage filter structure.

The device 100 operates in the following manner. A multi-frequency (multi-channel) input light signal $L_{in}$ enters the first-layer filter structure 201 from the light path 101 (an input fiber or a path of free-space light propagation). This filter structure 201 spatially separates between spectrally distinct groups of optical channels of the input light, wherein the channels may be grouped by a fixed frequency spacing (free spectral range) or within a fixed width optical bandwidth. The filter structure 201 is tuned to direct different frequency sub-sets $L^{(1)}_{in}$ and $L^{(2)}_{in}$ of the input light to the spatially separated output light-paths 103 and 102, respectively, wherein the sub-set $L^{(1)}_{in}$ has a specific frequency range of the input light, including a predetermined frequency component (or range) $L_0$, and the sub-set $L^{(2)}_{in}$ contains a remaining portion of the input light. The sub-set $L^{(1)}_{in}$ enters the second-layer filter structure 202, which operates to separate the frequency component $L_0$ and direct it to the drop channel 105, and to direct the remaining portion of the sub-set $L^{(1)}_{in}$ back to the filter 202 through the light path 104, to output the remaining portion of the sub-set $L^{(1)}_{in}$ through the light-path 102. This technique enables to minimize the tuning range of the second-layer filter structure 202 to address only the group of channels it contends with.

Both, the first and second-layer filters 201 and 202 may be implemented using ring-based resonators, or, alternatively, the second-layer filter can be realized using ring-based resonators, and the first-layer filter 201 using one of the following: grating assisted couplers, reflective grating structures such as sampled gratings, photonic crystals, etc., as will be described more specifically further below. The ring-based resonator structure disclosed in WO 01/27692, assigned to the assignee of the present application, can be used. This optical resonator structure is a combination of two spaced-apart waveguides and at least two spaced-apart resonator-cavity loops accommodated between the two waveguides and connected to each other through the sections of the waveguides, such that the spaced-apart resonator-cavity loops and the waveguide sections create a closed loop compound resonator for storing optical energy of a predetermined frequency range. The physical characteristics of the compound resonator are controllable (via the application of an external field) to adjust the optical storage characteristics of the compound resonator.

Figure 2:
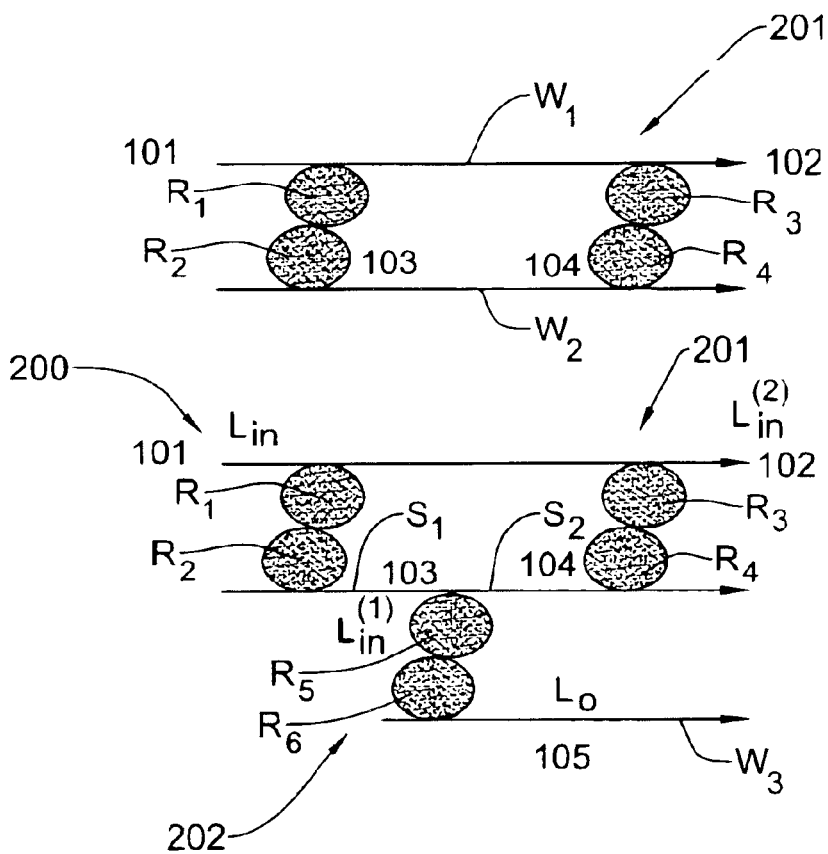
FIGS. 2 to 4 schematically illustrate three different examples, respectively, of the two-stage filter device according to the invention utilizing ring resonators in the first and second stage filtering.
Figure 3:
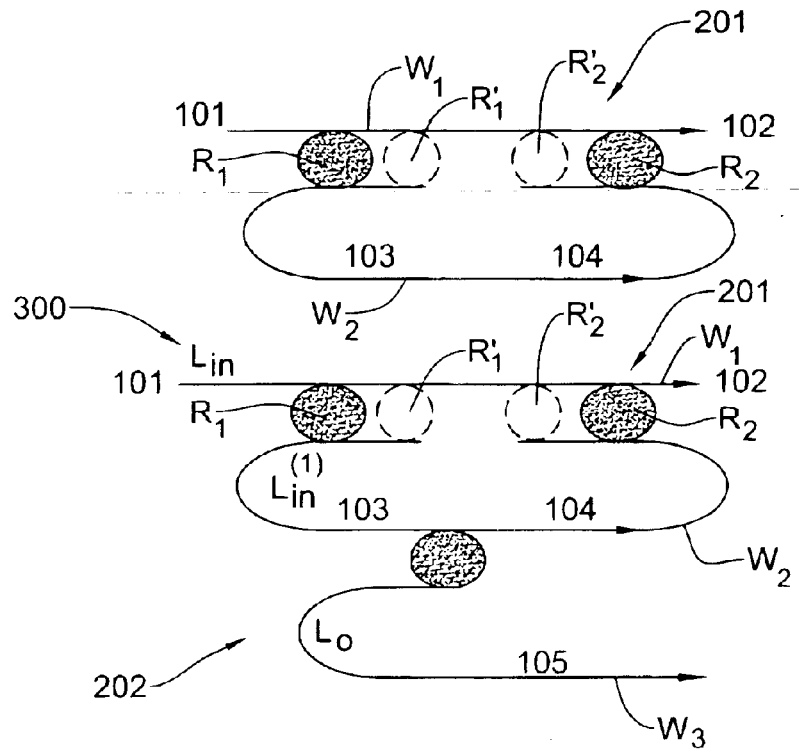
Figure 4:
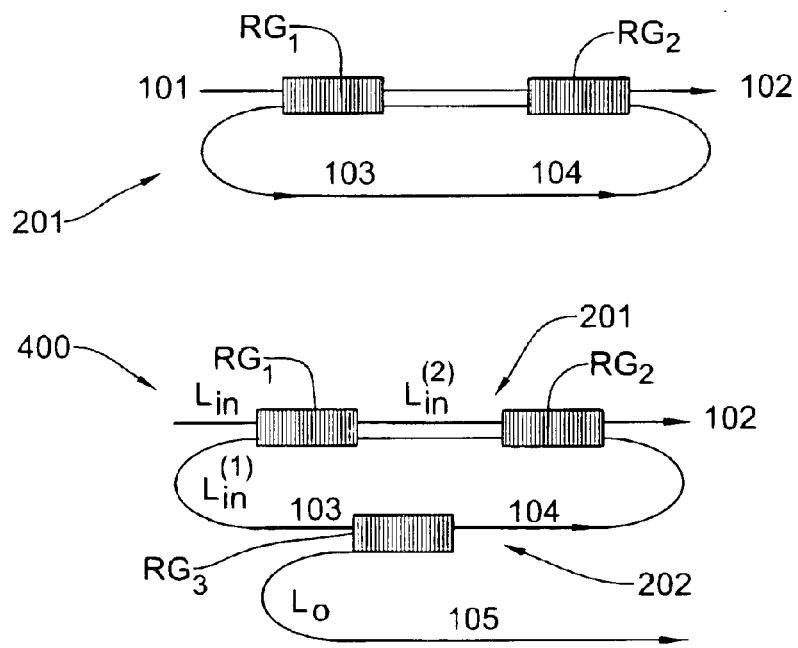
Figure 5A:
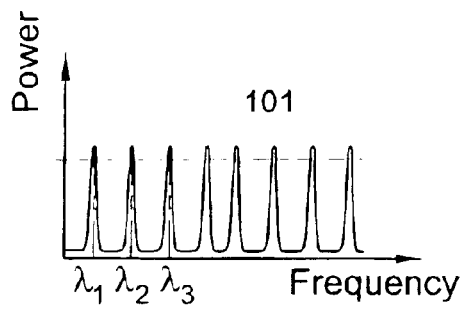
FIGS. 5A to 5D show the optical signal spectra of the filter device of FIGS. 2A–2C at the input light-path, intermediate output, intermediate input, add/drop port, and the output light-path of the device.
Figure 5B:
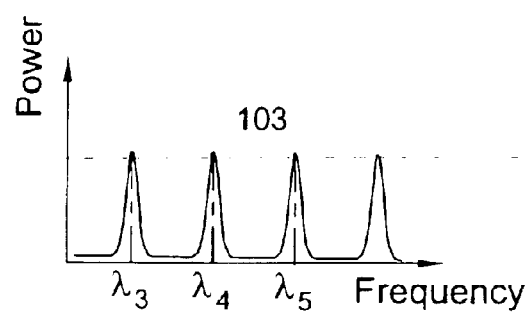
Figure 5C:
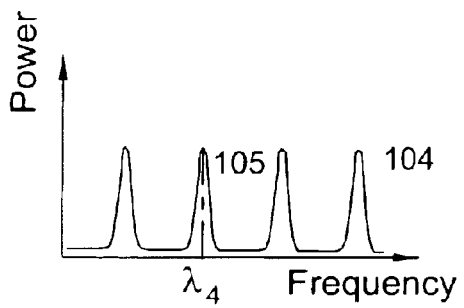
Figure 5D:
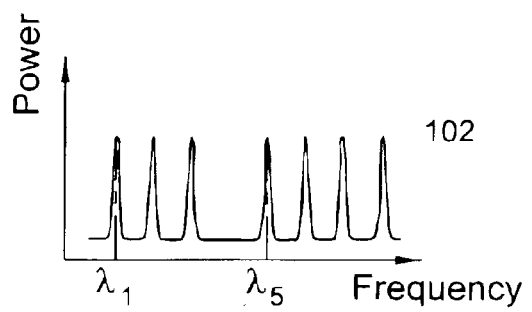

Reference is made to FIGS. 2 to 4 showing several examples of the implementation of the filter structure 201 and the tunable filter device utilizing this structure. To facilitate understanding, the same reference numbers are used to identify common functional components of all the examples of the invention.

As shown in FIG. 2, the first-layer filter structure 201 utilizes a multi-ring resonator structure—two ring-resonator pairs (combined filter units) $R_1$-$R_2$ and $R_3$-$R_4$ that are tuned to the same resonance frequency. The use of two ring-resonator pairs facilitates operation on a tunable sub-set of channels. A tunable filter device 200 thus utilizes this first-layer filter 201, and the second layer filter 202 using a double-ring resonator structure—a spring-resonator pair $R_5$-$R_6$. The two rings in each resonator structure (i.e., of the first- and second-layer filter) are optically coupled between them.

The first layer filter 201 presents a ring-resonator structure, wherein two ring-resonator pairs $R_1$-$R_2$ and $R_3$-$R_4$ are accommodated between and optically coupled to waveguides $W_1$ and $W_2$. The two ends of the waveguide $W_1$ are associated with the input and output channels 101 and 102, respectively, and two segments $S_1$ and $S_2$ of the waveguide $W_2$ at opposite sides of the ring-resonator pair $R_5$-$R_6$ define the intermediate output and input light-paths 103 and 104, respectively. The second-layer filter structure 202 is formed by the waveguide $W_2$, and output waveguide $W_3$ associated with an add/drop light-path 105, and the ring-resonator pair $R_5$-$R_6$ accommodated between and optically coupled to the waveguides $W_2$ and $W_3$.

The device 200 operates in the following manner. Input light $L_{in}$ is evanescently coupled from the input light-path 101 to the first ring resonator $R_1$ and the resonator pair $R_1$-$R_2$. Light $L^{(1)}_{in}$ that is resonant in the combined filter $R_1$-$R_2$ (i.e. light of a frequency range corresponding to the resonance condition of the combined resonator) is passed to the lower waveguide $W_2$ (its section $S_1$ defining the light-path 103), while "non-resonant" light $L^{(2)}_{in}$ remains on the top waveguide $W_1$. The free spectral range of the first layer filter 201 determines the number of channels passed (dropped) to the second waveguide $W_2$ from the channels introduced at the optical input 101. The filtered light $L^{(1)}_{in}$ passes through the ring-resonator pair $R_5$-$R_6$ which is tuned (with a minimized tuning range) to a predetermined frequency to be dropped and directs this frequency component $L_0$ to the waveguide $W_3$, i.e., to the light-path 105, while the other portion of light $L^{(1)}_{in}$ remains in the waveguide $W_2$ and passes through the resonator pair $R_3$-$R_4$ (which is tuned to the same resonance frequency as the first pair $R_1$-$R_2$) to the output light-path 102. Thus, all the channels (light $L_0$ of the predetermined frequency or frequency range) in the drop light-path 105 meet the resonance condition, and all the remaining input channels (with frequencies other than the predetermined one) appear at the output light-path 102.

In the example of FIG. 2, a ring resonator pair based filtering units are used to direct the output light components $L_0$ and $L^{(2)}_{in}$ in the same direction as the input light $L_{in}$. The same result can be achieved with a single ring resonator based filtering units. This is illustrated in FIG. 3 showing a filter structure 201 formed by waveguides $W_1$ and $W_2$ and two single-ring resonators $R_1$ and $R_2$ tuned to the same resonance frequency, and tunable filter device 300 utilizing this filter structure as a first-layer filter, and having a second-layer filter structure 202 formed by waveguides $W_2$ and $W_3$ and a single-ring resonator $R_3$. Each of the ring resonators $R_1$ and $R_2$ is optically coupled to the waveguides $W_1$ and $W_2$, and the ring resonator $R_3$ is optically coupled to the waveguides $W_2$ and $W_3$. The two ends of the waveguide $W_1$ are associated with the input and output channels 101 and 102, respectively, two segments $S_1$ and $S_2$ of the waveguide $W_2$ defining the intermediate output and input light-paths 103 and 104, respectively, and the waveguide $W_3$ defining the drop/add light-path 105 of the device 300. Thus, input light $L_{in}$ is evanescently coupled from the input light-path 101 to the ring resonator $R_1$, and light $L^{(1)}_{in}$, substantially of a frequency range corresponding to the resonance condition of the ring resonator $R_1$, passes through the ring $R_j$ to the waveguide $W_2$ (its section $S_1$ defining the light-path 103), while "non-resonant" light $L^{(2)}_{in}$, propagates through the waveguide $W_1$ to the output path 102. Light $L^{(1)}_{in}$ passes through the ring resonator $R_j$ tuned to a predetermined frequency (with a minimized tuning range) and directs this frequency component $L_0$ to the waveguide $W_3$ to be output at the light-path 105. The remaining portion of light $L^{(1)}_{in}$ propagates through the waveguide $W_2$ to the ring resonator $R_2$ that allows its propagation to the output light-path 102.

As further shown in FIG. 3 in dashed lines, each of the filter units may include an additional ring-resonator, denoted respectively $R'_1$, $R'_2$ and $R'_3$, thereby presenting a closed loop combined resonator. The closed loop resonator is a combination of two respective waveguides and two spaced-apart ring-resonators accommodated between these two waveguides and connected to each other through sections of these waveguides [WO 01/27692, assigned to the assignee of the present application].

In the example of FIG. 4, similar filter characteristics are obtained by utilizing reflective grating structures such as sampled gratings ["Monolithic Tunable Diode Lasers", L. A. Coldren, IEEE Journal On Selected Topics In Quantum Electronics, Vol. 6, No. 6, November/December 2000, p.988], photonic crystals ["Wavelength Division Multiplexing and Demultiplexing With Photonic Crystal Waveguide Couplers", Masanori Koshiba, Journal of Lightwave Technology, Vol. 19, No. 12, Dec. 2001, p.1027] or other similar units. Thus, a filter structure 201 includes two filter units $RG_1$ and $RG_2$, each being for example a reflective grating structure. A tunable filter device 400 utilizes this first-layer filter 201, and a second-layer filter 202 that includes a reflective grating filter unit $RG_3$ whose input is connected to the respective one of two outputs of the filter unit $RG_1$ and whose output in connected to the respective one of two inputs of the filter unit $RG_2$.

The present invention allows for using the second-stage filter structure (which can be constructed from any combination of the above optical filters) of a simpler tuning range or spectrum to address, as compared to that of the first-stage filter. When using GAC-based filters, the relative simplicity of the tuning range of the second-stage filter is in that it is of a smaller spectral range than that of the first-layer filter. When using a ring-based implementation, the simplicity is in that it has wider channel spacing, i.e., the channels that appear at the input of the second-stage filter have wider spacing than the spacing in the original WDM channel.

The tuning range required for each of the first- and second-stage filters is limited to the free spectral range (FSR) of the filter. Hence, by choosing a dissimilar FSR for the two filters, the resulting free spectral range of the filter combination (entire device) is given by the multiplication of the FSR of the first- and second-layer filters, whereas the tuning range required for each layer is limited to the FSR of the respective layer individually. As a result, a leverage effect is realized and smaller tuning requirements are achieved.

FIGS. 5A–5D illustrate the optical spectra at the light-paths 101, 103, 104, 105, and 102 for the filter device of either one of FIGS. 2–4. As shown, the input light (light-path 101) includes frequencies $\lambda_1$–$\lambda_8$. The first-stage filtering results in that a frequency band $\lambda_3$–$\lambda_8$ (defined by the filter shape) is filtered out to the light-path 103 and enters the second-stage filter, while other frequencies continue to the light-path 102. The second-stage filtering results in that the specific frequency component $\lambda_4$ is filtered out to the light-path 105, while the other frequencies $\lambda_3$, $\lambda_5$ and $\lambda_6$ remain in the light-path 104 and are directed to the output path 102.

Figure 6:
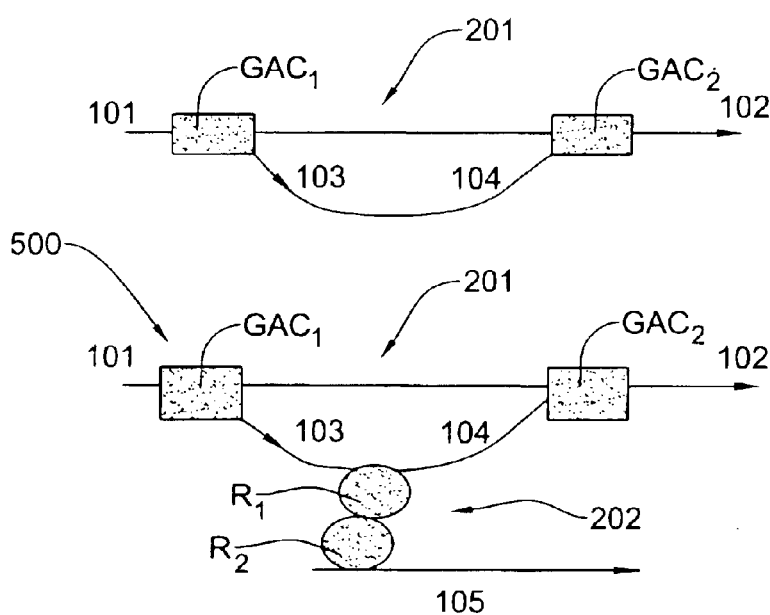
FIG. 6 is a schematic illustration of the two-stage filter device according to the invention utilizing a grating assisted coupler at the first stage filtering and ring resonators at the second stage filtering.
Figure 7A:
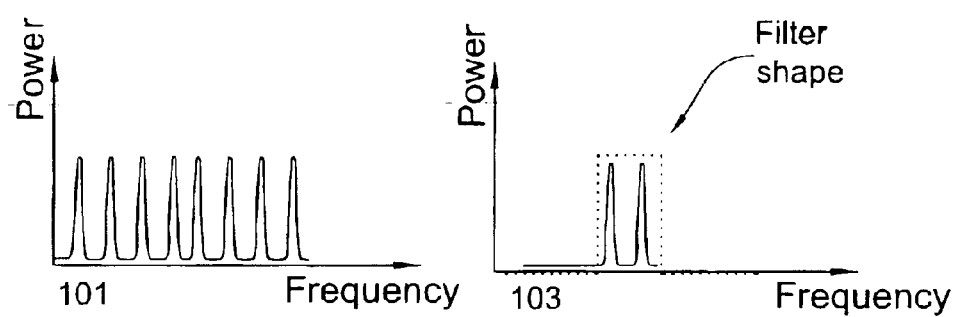
FIGS. 7A to 7D show the optical signal spectra of the filter device of FIG. 4 at the input light-path, intermediate output, intermediate input, add/drop port 105, and the output light-path of the device.
Figure 7B:
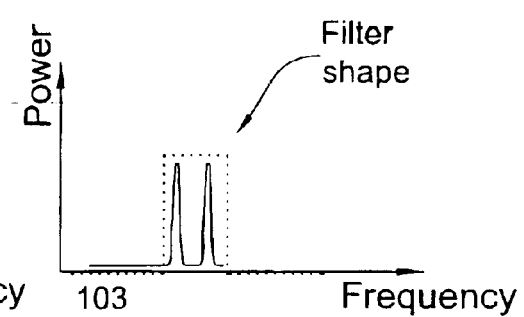
Figure 7C:
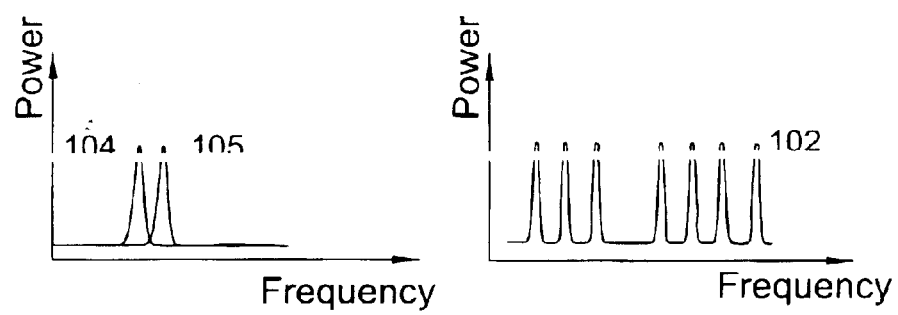
Figure 7D:
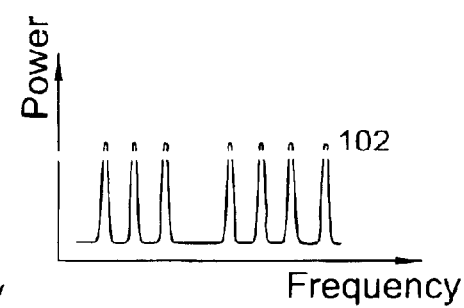

FIG. 6 illustrates yet another embodiment of the invention. Here, a filter 201 used in the first-stage filtering is realized by a wide bandwidth filter, such as a grating assisted coupler (GAC) filter, a coarse wavelength division multiplexing thin film filter [U.S. Pat. No. 5,629,995] or a filter based on any other similar technique. This first-stage filter, similarly to that of FIG. 4 is composed of two filter units $GAC_1$ and $GAC_2$. A filter device 500 thus utilizes such a first-stage filter 201 and a second-stage filter 202 having a double-ring resonator structure $R_1$-$R_2$. The bandwidth of the first stage filter 201 is chosen to be smaller than the free spectral range of the second-stage filter 202. Preferably, the GAC filter is chosen for the first-stage filter, since for a given filter design the ratio between the tuning range and filter bandwidth is fixed. As a result, by increasing the bandwidth of the GAC up to the FSR of the second layer filter, large tuning ranges can be obtained. A similar approach is used in realizing tunable lasers ["114 nm Wavelength Tuning Range of a vertical grating assisted co-directional coupler laser with a super structure grating distributed Bragg reflector", P. J. Rigole, et. al., IEEE Photonics Technology Letters, Vol. 7 No. 7 July 1995, p. 697], wherein a combination of two filters is used within the laser cavity.

FIGS. 7A–7D shows the optical spectra at the light-paths 101, 103, 104, 105, and 102 for the filter device of FIG. 4, thereby illustrating, in a self-explanatory manner, the operation of the first- and second-stage filters.

Those skilled in the art will readily appreciate that various modifications and changes can be applied to the embodiments of the invention as hereinbefore exemplified without departing from its scope defined in and by the appended claims.

What is claimed is:

1. A tunable filter structure for use in processing an input multi-frequency light signal to separate therefrom light of a predetermined frequency range, the filter structure comprising an input for receiving the multi-frequency input light signal, a first output for outputting a first light component of the input light signal including light of said predetermined frequency range, a second output for outputting a second light component including a remaining portion of the input light signal, and an intermediate input.

2. The filter structure according to claim 1, comprising at least one filter unit including at least one of the following: a grating assisted coupler, closed loop resonator, a reflective grating, and a photonic crystal.

3. The filter structure according to claim 1, comprising first and second successive filter units tuned to the same frequency band, the first filter unit having an input presenting said input of the filter structure and two outputs, one of which being connected to an input of the second filter unit and the other presenting said first output of the filter structure, and the second filter unit having one output presenting the second output of the filter structure and two inputs, one connected to the output of the first filter unit and the other presenting said intermediate input of the filter structure.

4. The filter structure according to claim 3, wherein each of the first and second filter units includes one of the following: a grating assisted coupler, closed loop resonator, a reflective grating, and a photonic crystal.

5. An optical device comprising:
    a tunable filter structure operable to process an input multi-frequency light signal to separate therefrom light of a predetermined frequency range, the filter structure comprising an input for receiving the multi-frequency input light signal, a first output for outputting a first light component of the input light signal including light of said predetermined frequency range, a second output for outputting a second light component including a remaining portion of the input light signal, and an intermediate input; and
    a tunable frequency-selective optical unit having an input for receiving said first light component and an output for directing to said intermediate input of the filter structure a portion of said first light component outside a tuning range of the optical unit.

6. The device according to claim 5, wherein said tunable filter structure comprises at least one filter unit including at least one of the following: a grating assisted coupler, closed loop resonator, a reflective grating, and a photonic crystal.

7. The device according to claim 5, wherein said tunable frequency-selective optical unit is operable as one of the following: a filter, an amplifier, and an attenuator.

8. An optical filter device for processing a multi-frequency light signal to separate therefrom a predetermined frequency component, the device comprising first and second tunable filter structures with overlapping optical spectra, the first filter structure being operable to receive the input light signal, separate therefrom light of a specific frequency range including said predetermined frequency component, and direct said light to the second filter structure while directing a remaining portion of the input light to a second output of the device, the second filter structure being operable to receive the light of the specific frequency range and separating therefrom the predetermined frequency component to a first output of the device while directing a remaining portion of said light into the first filter structure to be output at the second output of the device.

9. The device according to claim 8, wherein the first filter structure includes one of the following: a grating assisted coupler, a ring-resonator based structure, a reflective grating, and a photonic crystal.

10. The device according to claim 8, wherein the second filter structure includes one of the following: a grating assisted coupler, a ring-resonator based structure, a reflective grating, and a photonic crystal.

11. The device according to claim 9, wherein the second filter structure includes one of the following: a grating assisted coupler, a ring-resonator based structure, a reflective grating, and a photonic crystal.

12. The device according to claim 8, wherein
    the first filter structure has an input associated with an input port of the device for receiving the input multi-frequency light, an output associated with the second output port of the device for outputting the remaining portion of the input light outside said predetermined frequency range, an intermediate input, and an intermediate output;
    the second filter structure has an input associated with the intermediate output of the first filter structure, a through port associated with the intermediate input of the first filter structure, and an output associated with the first output of the device.

13. The device according to claim 12, for separating from the input light at least one additional different frequency range, the device comprising at least one additional first output port, and at least one additional second filter structure, whose input and through ports are associated with an additional pair of the intermediate output and input of the first filter, and whose output is associated with said at least one additional first output port of the device.

14. The device according to claim 8, wherein
    the first filter structure has first and second filter units, wherein the first filter unit has an input for receiving the input multi-frequency light signal and two outputs, one connected to an input of the second filter structure for directing thereto said light of the specific frequency range and the other connected to an input of the second filter unit for directing thereto the remaining portion of the input light, and the second filter unit has an additional input and has an output that is connected to the second output of the device;

the second filter structure has said input connected to the output of the first filter unit of the first filter structure, and two outputs, one connected to the first output of the device and the other connected to said additional input of the second filter unit of the first filter structure.

15. An optical filter device, wherein:

the device comprises an input light port, first and second output ports, and first and second tunable filter structures having tuning ranges defining overlapping spectra of the filters, the device being operable to transfer a predetermined frequency component of a multi-frequency input light signal to the first output port and transfer a remaining portion of the input light signal to the second output port;

a first tunable filter structure has an input connected to said input light port, an output connected to said second output port, an intermediate input, and an intermediate output;

the second tunable filter structure has an input connected to the intermediate output of the first filter structure, a through port connected to the intermediate input of the first filter structure, and an output connected to the first output port of the device.

16. An optical filter device for processing a multi-frequency light signal to separate therefrom a predetermined frequency component, the device comprising:

(a) a first tunable filter structure having a first tuning range and operable to receive an input light signal and output first and second light components thereof through first and second spatially separated light paths, respectively, the first light component having a specific frequency range of the input signal including said predetermined frequency component, and the second light component including a remaining portion of the input light;

(b) a second tunable filter structure having a second tuning range defining an optical spectrum overlapping with that of the first filter, the second filter being operable to receive the first light component and separate therefrom said predetermined frequency component to propagate to a drop/add light path of the device and direct a remaining portion of the first light component into the first filter structure to be output at the second light path.

17. A method for processing a multi-frequency light signal to separate therefrom a predetermined frequency component, the method comprising:

applying to the multi-frequency input light signal a first filtering with a first tuning range, thereby providing first and second light components of the input signal propagating along first and second spatially separated optical paths, respectively, the first light component having a specific frequency range of the input signal including said predetermined frequency component, and the second light component including a remaining portion of the input signal;

applying to the first light component a second filtering with a second tuning range in an optical spectrum overlapping with that of the filtering, thereby separating said predetermined frequency component from the first light component and directing it to an output channel while directing a remaining portion of the first light component to undergo said first filtering to be output at said second light path.

18. The method according to claim 1, wherein said first filtering is carried out by a first filter structure including one of the following: a grating assisted coupler, a ring-resonator based structure, a reflective grating, and a photonic crystal.

* * * * *